(12) United States Patent
Miyata

(10) Patent No.: US 10,194,055 B2
(45) Date of Patent: Jan. 29, 2019

(54) IMAGE PROCESSING APPARATUS AND IMAGE FORMING APPARATUS

(71) Applicant: KYOCERA Document Solutions Inc., Osaka (JP)

(72) Inventor: Mitsuko Miyata, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/560,456

(22) PCT Filed: Mar. 11, 2016

(86) PCT No.: PCT/JP2016/057750
§ 371 (c)(1),
(2) Date: Sep. 21, 2017

(87) PCT Pub. No.: WO2016/158317
PCT Pub. Date: Oct. 6, 2016

(65) Prior Publication Data
US 2018/0077320 A1 Mar. 15, 2018

(30) Foreign Application Priority Data
Mar. 31, 2015 (JP) ................. 2015-072174

(51) Int. Cl.
| H04N 1/60 | (2006.01) |
| H04N 1/409 | (2006.01) |
| H04N 1/32 | (2006.01) |
| H04N 1/58 | (2006.01) |
| H04N 1/393 | (2006.01) |

(52) U.S. Cl.
CPC ....... *H04N 1/6008* (2013.01); *H04N 1/32561* (2013.01); *H04N 1/409* (2013.01); *H04N 1/58* (2013.01); *H04N 1/60* (2013.01); *H04N 1/3935* (2013.01)

(58) Field of Classification Search
CPC .................................................. H04N 1/6008
USPC .......................................................... 358/1.9
See application file for complete search history.

(56) References Cited

U.S. PATENT DOCUMENTS

| 5,867,634 | A | 2/1999 | Hirota et al. | |
| 6,600,832 | B1 | 7/2003 | Nakayama et al. | |
| 2004/0125410 | A1* | 7/2004 | Shirata ............... | G06K 9/00456 358/2.1 |
| 2007/0201060 | A1* | 8/2007 | Fukuda ............... | H04N 1/3935 358/1.9 |
| 2007/0292041 | A1 | 12/2007 | Ito | |
| 2008/0074518 | A1* | 3/2008 | Beck ...................... | H04N 9/045 348/272 |

(Continued)

FOREIGN PATENT DOCUMENTS

| JP | H08-186725 | 7/1996 |
| JP | 2000-316097 | 11/2000 |

*Primary Examiner* — Jacky X Zheng

(57) ABSTRACT

An area separation unit 22 determines a character in an input image on the basis of image data of the input image. The filter processing unit 23 performs a filter process for a character edge area of a character in an input image, and the color conversion unit 24 performs a color conversion process for a pixel in the character edge area in accordance with a color conversion characteristic that (a) is different from a color conversion characteristic for a pixel other than a pixel in the character edge area and (b) compensates a color error due to the filter process.

2 Claims, 4 Drawing Sheets

(56) References Cited

U.S. PATENT DOCUMENTS

2014/0023268 A1   1/2014   Tamura

* cited by examiner

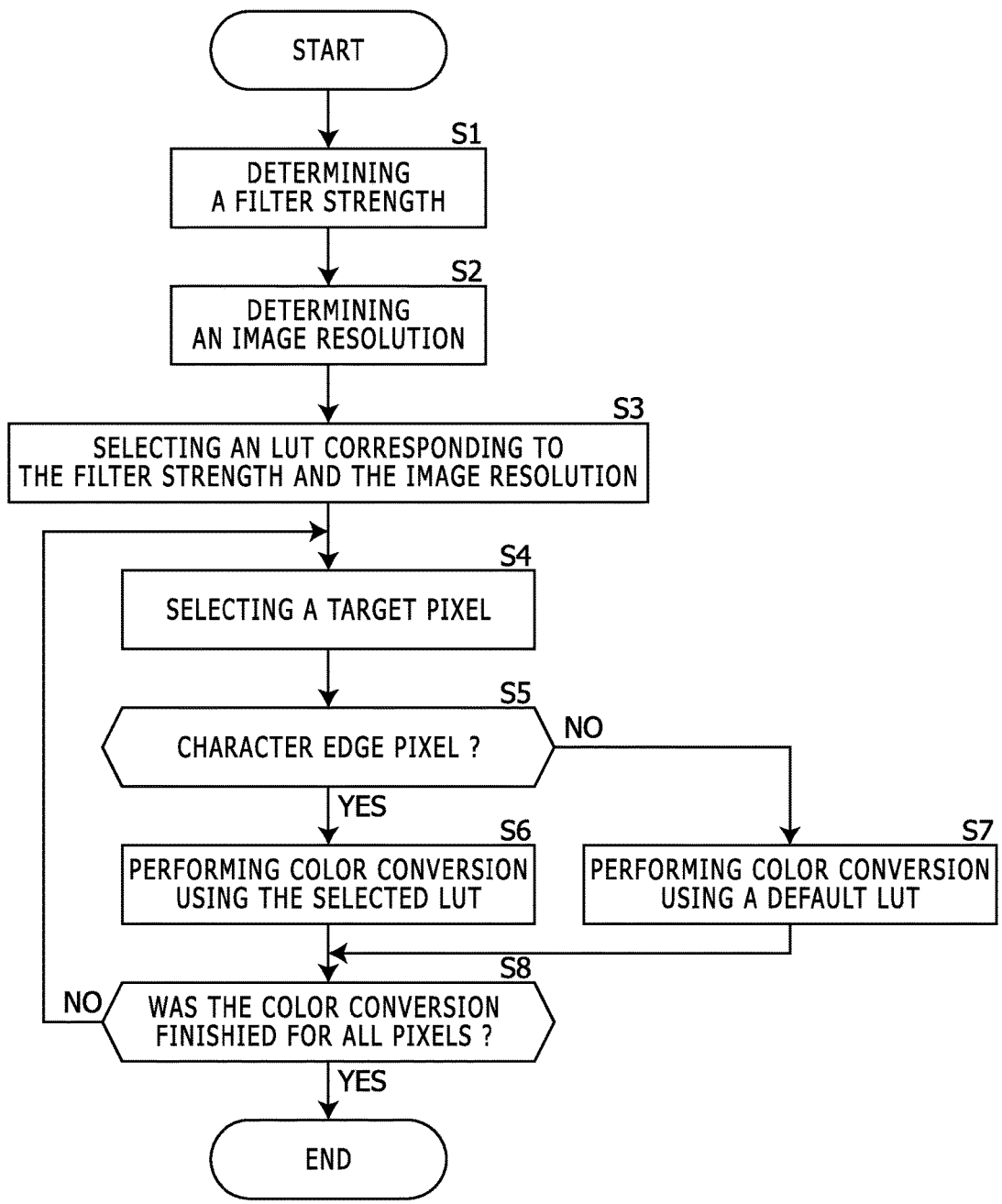

IMAGE PROCESSING APPARATUS AND IMAGE FORMING APPARATUS

TECHNICAL FIELD

The present invention relates to an image processing apparatus and an image forming apparatus.

BACKGROUND ART

An image processing apparatus detects an edge of a black character in a document image, and performs an emphasis process for the edge (see PATENT LITERATURE #1).

Further, another image processing apparatus detects a black edge in a document image, replaces CMY (Cyan, Magenta, Yellow) values of a pixel having the lowest density among adjacent pixels to a pixel on the black edge with CMY values of this pixel on the black edge, and increases a black value of this pixel on the black edge (see PATENT LITERATURE #2).

CITATION LIST

Patent Literature

PATENT LITERATURE #1: Japanese Patent Application Publication No. 2000-316097.
PATENT LITERATURE #2: Japanese Patent Application Publication No. H8-186725.

SUMMARY OF INVENTION

Technical Problem

When performing color conversion after performing an emphasis filter process to a character edge as performed by the aforementioned image processing apparatus, same colors of plural pixels in an image before the filter process may change to different colors from each other, and after the color conversion, such colors sometimes have different hues from each other. Thus, such process causes a chroma of a black character to increase and causes not only a chroma but a hue of color character (i.e. chromatic character) to change.

Therefore, for such a color character, the weaker emphasis process may be performed than that for a black character, using a chroma gain of the filter process, but in such a case, although the hue change is restrained, sharpness of the character is not improved because the emphasis is weakened.

The present invention has been conceived in order to solve this problem, and provide an image processing apparatus and an image forming apparatus that restrain a difference between a color of a pixel in a character edge area and a color of a pixel out of the character edge area after a filter process and color conversion when the color of the pixel in the character edge area is same as the color of a pixel out of the character edge area before the filter process.

Solution to Problem

An image processing apparatus according to an aspect of the present invention includes: an area separation unit that determines a character in an input image on the basis of image data of the input image; a filter processing unit that performs a filter process for a character edge area of the character; and a color conversion unit that performs a color conversion process for a pixel in the character edge area in accordance with a color conversion characteristic that (a) is different from a color conversion characteristic for a pixel other than a pixel in the character edge area and (b) compensates a color error due to the filter process.

An image forming apparatus according to an aspect of the present invention includes: the image processing apparatus, and a printing device that prints an image based on image data after color conversion performed by the color conversion unit.

Advantageous Effect of Invention

According to the present invention, a difference is restrained between a color of a pixel in a character edge area and a color of a pixel out of the character edge area after a filter process and color conversion when the color of the pixel in the character edge area is same as the color of a pixel out of the character edge area before the filter process.

These and other objects, features and advantages of the present invention will become more apparent upon reading of the following detailed description along with the accompanied drawings.

BRIEF DESCRIPTION OF DRAWINGS

FIG. 4 shows a flowchart that explains a behavior of a color conversion unit 24 shown in FIG. 1.

DESCRIPTION OF EMBODIMENTS

Hereinafter, an embodiment of the present invention will be explained with reference to drawings.

Figure 1:
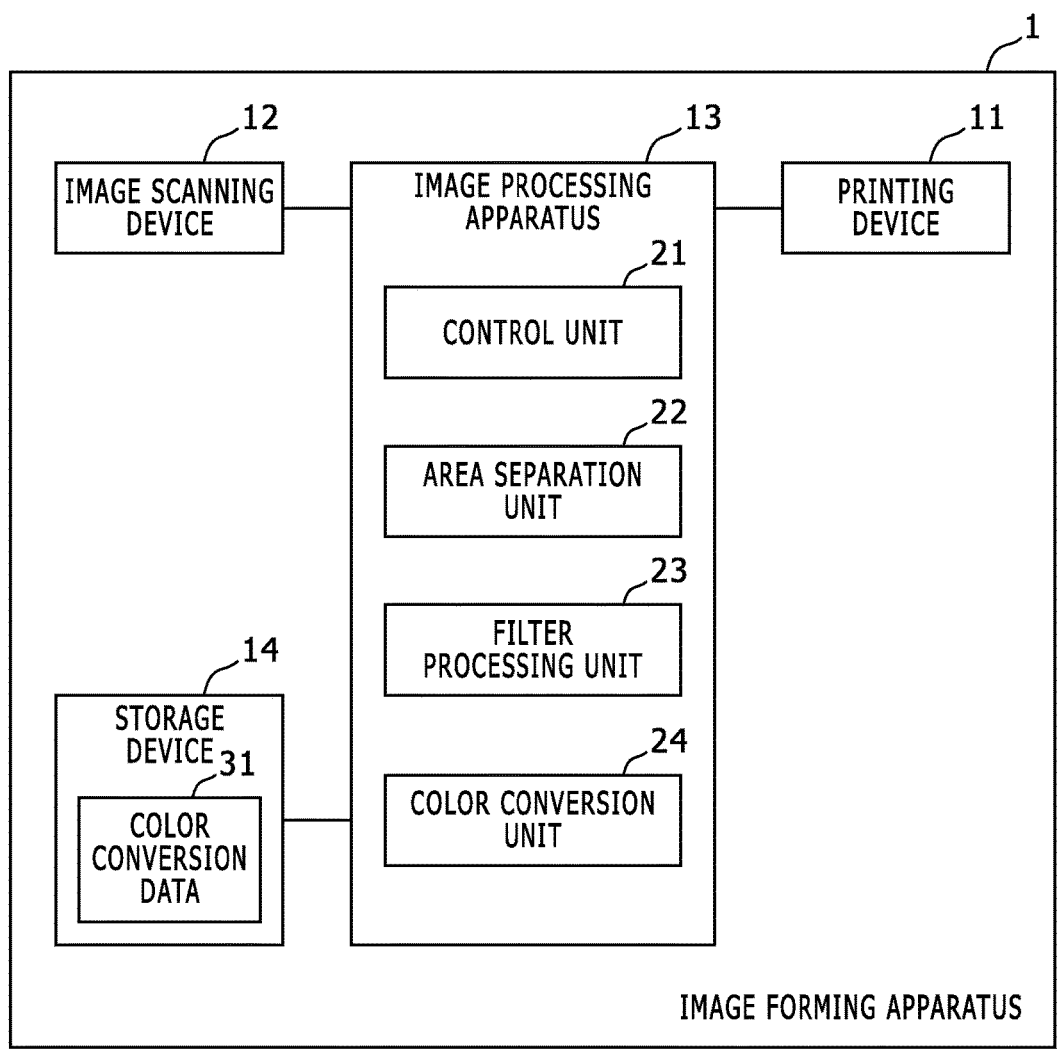
FIG. 1 shows a block diagram that indicates a configuration of an image forming apparatus according to an embodiment of the present invention.

FIG. 1 shows a block diagram that indicates a configuration of an image forming apparatus according to an embodiment of the present invention. Here, the image forming apparatus 1 shown in FIG. 1 is a copier. The image forming apparatus 1 may be a multi function peripheral or the like.

The present image forming apparatus 1 includes a printing device 11, an image scanning device 12, an image processing apparatus 13, and a storage device 14.

The printing device 11 is an example of an outputting device and internal device that prints a document image based on image data after color conversion performed by the image processing apparatus 13 in an electrophotographic process using toner of CMYK (Cyan, Magenta, Yellow, and Black) colors.

The image scanning device 12 is an internal device that optically scans a document image of a document and generates image data of the document image as RGB data.

The image processing apparatus 13 performs image processing such as color conversion for image data such as the image data generated by the image scanning device 12.

Further, the storage device 14 is a non volatile rewritable storage device such as a flash memory and stores sorts of data.

The image processing apparatus 13 is formed with an ASIC (Application Specific Integrated Circuit) and/or a microcomputer, and includes a control unit 21, an area separation unit 22, a filter processing unit 23, and a color conversion unit 24. Further, the storage device 14 stores color conversion data 31. The color conversion data 31 includes color conversion tables (lookup tables) corresponding to plural color conversion characteristics. In this embodiment, the color conversion data 31 includes color conversion tables (lookup tables) corresponding to plural filter strengths and plural scanning resolutions. The color conversion table (lookup table) converts RGB data to CMY data and compensates color change due to a filter process.

Figure 2:
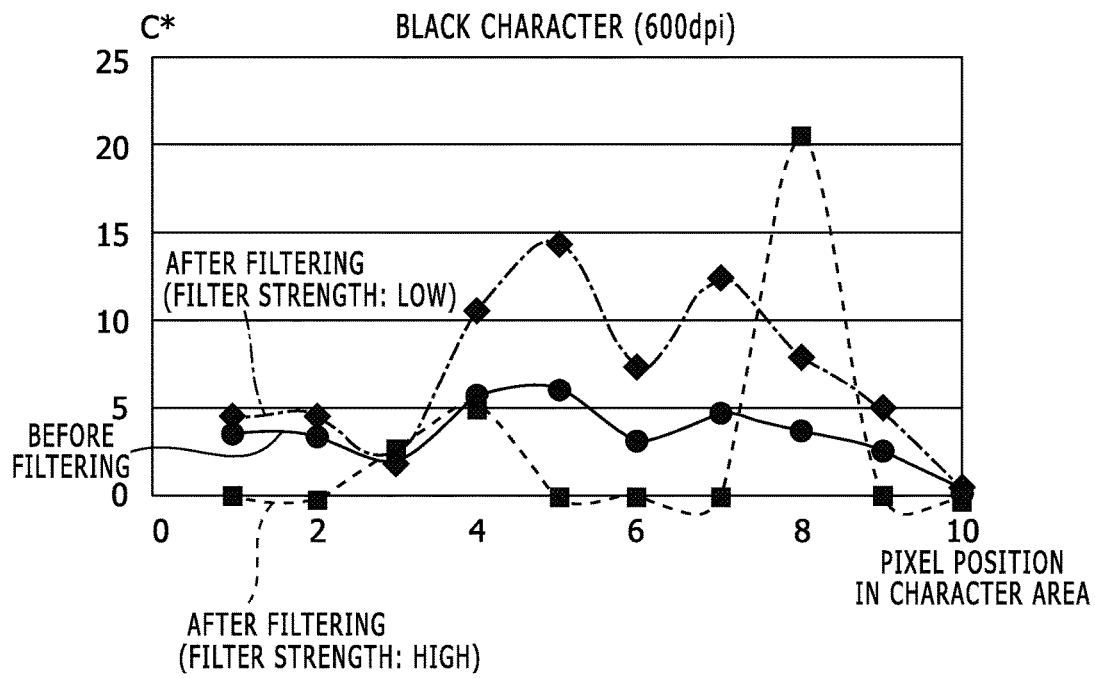
FIG. 2 shows a diagram that explains change of a chroma value of a black character among filter strengths and scan resolutions.
Figure 2:
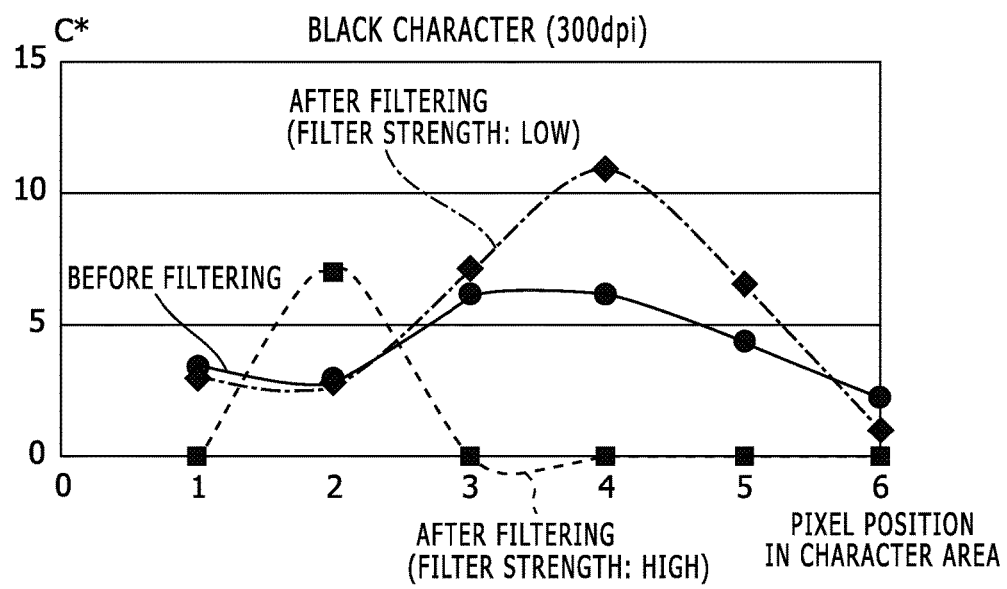

FIG. 2 shows a diagram that explains change of a chroma value of a black character among filter strengths and scan resolutions. As shown in FIG. 2, a chroma characteristic of a black character after a filter process has changed from a characteristic before the filter process, and a chroma characteristic of a black character after a filter process has changed in accordance with its filter strength and a scanning resolution.

Figure 3:
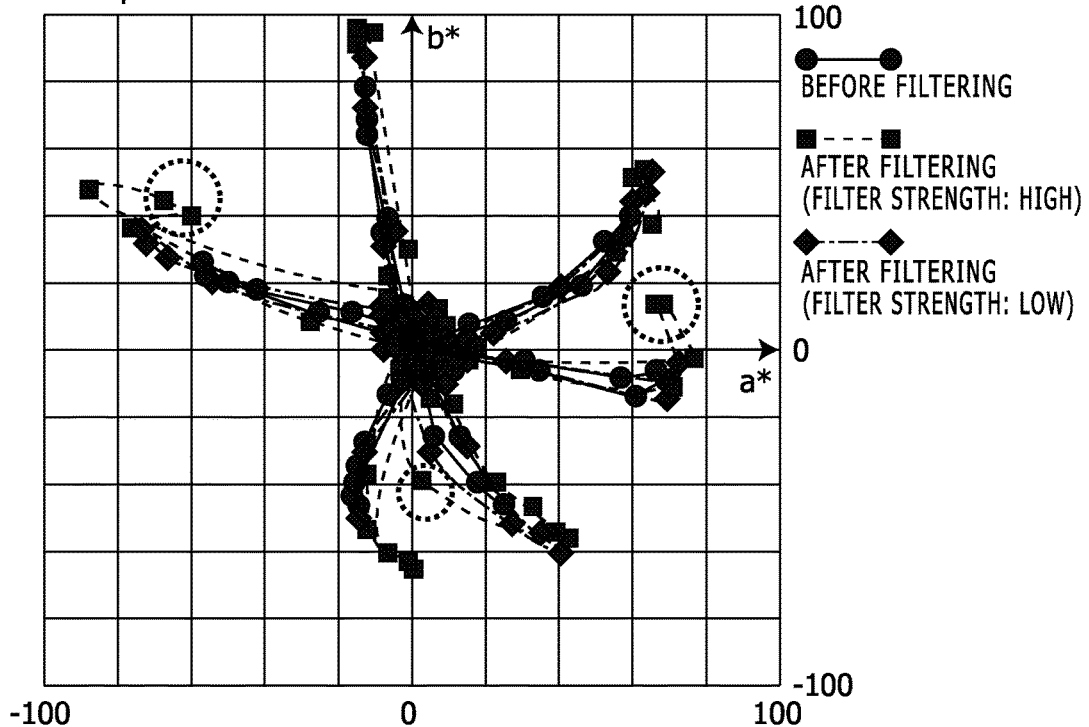
FIG. 3 shows a diagram that explains change of a chroma and a hue of a color character among filter strengths and scan resolutions.
Figure 3:
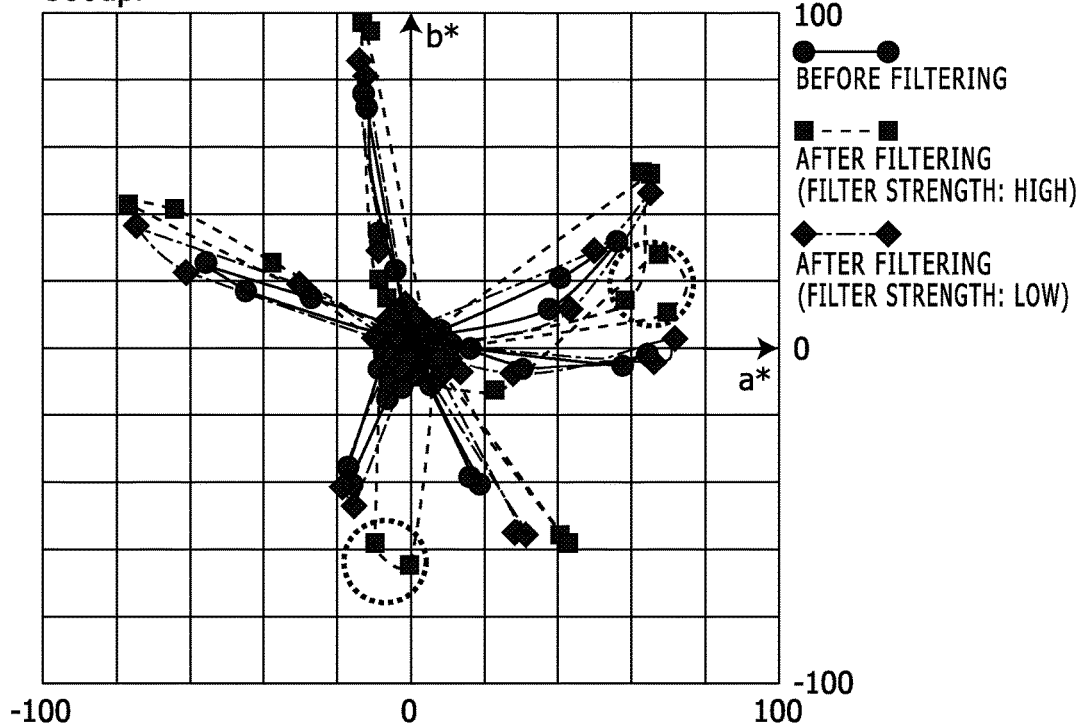

FIG. 3 shows a diagram that explains change of a chroma and a hue of a color character among filter strengths and scan resolutions. FIG. 3 shows chroma-and-hue characteristics in the a*-b* plane of color characters with predetermined six colors (i.e. six hues) before and after a filter process. As shown in FIG. 3, a chroma-and-hue characteristic of a color character after a filter process has changed from a characteristic before the filter process in accordance with its filter strength and a scanning resolution.

As shown in FIGS. 2 and 3, in accordance with a filter strength and a scanning resolution, a chroma characteristic of a black character and a chroma-and-hue characteristic of a color character changes, and therefore lookup tables of plural color conversion characteristics corresponding to plural filter strengths and plural scanning resolutions are included in the color conversion data 31.

For example, a lookup table for each one of such color conversion characteristics can be set so as to output a black value (i.e. with a chroma of zero) for an input in a low chroma range corresponding to a filter strength and a scanning resolution (i.e. a range equal to or less than a chroma corresponding to a filter strength and a scanning resolution) and so as to output a color value obtained by changing an inputted hue value to a proper hue value (for example, a hue value of a color obtained by color conversion using the same filter process and a default lookup table for the same color out of a character edge area in an input image) for an input in a specific chroma-and-hue area set in accordance with a filter strength and a scanning resolution (for example, a range indicated by a dashed circle in FIG. 3). This specific chroma-and-hue area is set at a part where a difference from a proper hue value occurs due to a filter strength and a scanning resolution.

For example, in FIGS. 2 and 3, the scanning resolution takes 2 levels: 600 dpi and 300 dpi and the filter strength takes 2 levels: HIGH and LOW, and therefore, four lookup tables are included in the color conversion data 31 as lookup tables for a character edge; and alternatively, one or both of the scanning resolution and the filter strength may take 3 levels or more and lookup tables may be included in the color conversion data 31 for respective such conditions.

Further, the scanning resolution may take 2 levels: a range equal to or larger than 600 dpi and a range equal to or less than 300 dpi, and lookup tables may be included in the color conversion data 31 for respective levels.

The controller 21 controls the printing device 11 and the image scanning device 12, and thereby obtains image data of a document image with specifying a scanning resolution and performs printing of the document image after the image processing performed by the image processing unit 13.

The area separation unit 22 determines a character in an input image on the basis of image data of the input image. Here the input image is a document image scanned by the image scanning device 12. The area separation unit 22 determines not only a black character but a color character.

Further, the area separation unit 22 determines a character edge area of the determined character. The character edge area is an area with a width from an edge of the determined character, and this width is the predetermined number of pixels equal to or larger than 1 pixel.

The filter processing unit 23 performs a filter process for the character edge area of the determined character. For example, as the filter process, the filter processing unit 23 calculates a sum of products between filter coefficients in a matrix of N by M pixels and pixel values of pixels at positions corresponding to the filter coefficients respectively.

The color conversion unit 24 performs color conversion of the input image after performing the filter process. Here, the color conversion unit 24 performs a color conversion process for a pixel in the character edge area in accordance with a color conversion characteristic that (a) is different from a color conversion characteristic for a pixel other than a pixel in the character edge area and (b) compensates a color error due to the filter process.

Further, in this embodiment, the color conversion unit 24 performs the color conversion process for the pixel in the character edge area in accordance with the color conversion characteristic corresponding to a strength of the aforementioned filter process. Specifically, the strength (here, emphasis strength) of the filter process in the filter processing unit 23 is variable, and the color conversion unit 24 obtains from the filter processing unit 23 information on the strength of the filter process in the filter processing unit 23 and selects a lookup table in the color conversion data 31 in accordance with the strength of the filter process.

Further, in this embodiment, the color conversion unit 24 performs the color conversion process for a pixel in the character edge area in accordance with the color conversion characteristic corresponding to a resolution at which the input image was scanned by the image scanning device 12. Specifically, the scanning resolution of the image scanning device 12 is variable, and the color conversion unit 24 obtains from the control unit 21 information on the scanning resolution of the input image and selects a lookup table in the color conversion data 31 in accordance with the scanning resolution.

The following part explains a behavior of the aforementioned image forming apparatus 1.

Firstly, the control unit 21 controls the image scanning device 12 and thereby obtains as an input image a document image scanned from a document by the image scanning device 12. Here the input image is an image of RGB color data. Subsequently, the area separation unit 22 analyzes this input image and thereby detects an object such as a character in the input image. Further, in this process, the area separation unit 22 determines a character edge area of a character in the input image. In addition, the filter processing unit 23 performs an emphasis filter for the character edge area.

In the aforementioned manner, the input image for which the filter process was performed is converted from RGB color data to CMY color data by the color conversion unit 24. FIG. 4 shows a flowchart that explains a behavior of the color conversion unit 24 shown in FIG. 1.

Firstly, the color conversion unit 24 determines a filter strength for the input image (in Step S1) and determines a scanning resolution of the input image (in Step S2).

Subsequently, the color conversion unit 24 selects a lookup table corresponding to the determined filter process strength and the determined scanning resolution (in Step S3).

Subsequently, the color conversion unit 24 selects as a target pixel a pixel in the input image after the filter process in turn along a scanning direction (in Step S4).

The color conversion unit 24 determines whether the target pixel is a pixel within the character edge area or not (in Step S5).

If the target pixel is a pixel within the character edge area, then the color conversion for the target pixel is performed using the lookup table selected in Step S3 (in Step S6), and if the target pixel is not a pixel within the character edge area, then the color conversion for the target pixel is performed using a default lookup table without the lookup table selected in Step S3 (in Step S7).

Subsequently, the color conversion unit 24 determines whether the color conversion was finished for all pixels in the input image after the filter process (in Step S8); and if the color conversion was not finished for all the pixels, then returning to Step S4, a next target pixel to the current target pixel is selected (in Step S4), and the same process is performed for this target pixel. In Step S8, if the color conversion was finished for all pixels in the input image after the filter process, then the color conversion unit 24 terminates the color conversion process for this input image.

After finishing the color conversion process for the input image, a black generation and UCR (Under Color Removal) process generates CMYK data from the CMY data of the input image generated in the color conversion process, and an image based on the CMYK data is printed by the printing device 11.

As mentioned, in this embodiment, the filter processing unit 23 performs a filter process for a character edge area of a character in an input image; and the color conversion unit 24 performs a color conversion process for a pixel in the character edge area in accordance with a color conversion characteristic that (a) is different from a color conversion characteristic for a pixel other than a pixel in the character edge area and (b) compensates a color error due to the filter process.

Consequently, a difference is restrained between a color of a pixel in a character edge area and a color of a pixel out of the character edge area after a filter process and color conversion when the color of the pixel in the character edge area is same as the color of a pixel out of the character edge area before the filter process.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to an image forming apparatus such as a multi function peripheral.

The invention claimed is:

1. An image processing apparatus, comprising:
an area separation unit that determines a character in an input image on the basis of image data of the input image; wherein the input image is an image scanned by an image scanning device;
a filter processing unit that performs a filter process for a character edge area of the character; and
a color conversion unit that performs a color conversion process for a pixel in the character edge area in accordance with a color conversion characteristic that (a) is different from a color conversion characteristic for a pixel other than a pixel in the character edge area and (b) compensates a color error due to the filter process; wherein the color conversion unit performs the color conversion process for the pixel in the character edge area in accordance with the color conversion characteristic corresponding to a strength of the filter process and in accordance with the color conversion characteristic corresponding to a resolution at which the input image was scanned by the image scanning device; wherein the color conversion process comprises using a lookup table among a group of lookup tables wherein the lookup table is selected based on the filter strength and the resolution at which the input image was scanned by the image scanning device.

2. An image forming apparatus, comprising:
an image processing apparatus, and
a printing device;
wherein the image processing apparatus comprises:
an area separation unit that determines a character in an input image on the basis of image data of the input image;
a filter processing unit that performs a filter process for a character edge area of the character; and
a color conversion unit that performs a color conversion process for a pixel in the character edge area in accordance with a color conversion characteristic that (a) is different from
a color conversion characteristic for a pixel other than a pixel in the character edge area and (b) compensates a color error due to the filter process; wherein the input image is an image scanned by an image scanning device; wherein the color conversion unit performs the color conversion process for the pixel in the character edge area in accordance with the color conversion characteristic corresponding to a strength of the filter process and in accordance with the color conversion characteristic corresponding to a resolution at which the input image was scanned by the image scanning device; wherein the color conversion process comprises using a lookup table among a group of lookup tables wherein the lookup table is selected based on the filter strength and the resolution at which the input image was scanned by the image scanning device and
the printing device prints an image based on image data for which the color conversion process performed by the color conversion unit.

* * * * *